United States Patent [19]
Funk

[11] Patent Number: 4,598,669
[45] Date of Patent: Jul. 8, 1986

[54] CONTROL OF A SYSTEM FOR SUPPLYING HEAT

[75] Inventor: Gary L. Funk, Bartlesville, Okla.

[73] Assignee: Phillips Petroleum Company, Bartlesville, Okla.

[21] Appl. No.: 705,828

[22] Filed: Feb. 26, 1985

[51] Int. Cl.⁴ .................. F02M 41/00; G06G 7/57
[52] U.S. Cl. .................. 122/448 R; 236/9 R; 237/8 R; 364/510
[58] Field of Search .............. 122/448 R, 448 A; 236/15 BF; 364/557, 510, 165; 237/8 R

[56] References Cited
U.S. PATENT DOCUMENTS

| | | | |
|---|---|---|---|
| 1,736,266 | 11/1929 | Kirkeby. | |
| 4,171,771 | 10/1979 | Colthorpe et al. | 237/8 R |
| 4,364,512 | 12/1982 | Morrison | 236/9 A |
| 4,371,779 | 2/1983 | Maynard et al. | 219/328 |
| 4,386,623 | 6/1983 | Funk et al. | 137/2 |
| 4,433,810 | 2/1984 | Gottlieb | 237/8 R |
| 4,434,746 | 3/1984 | Stewart | 122/448 R |
| 4,542,849 | 9/1985 | Pichot et al. | 237/8 C X |

Primary Examiner—William E. Wayner
Attorney, Agent, or Firm—French & Doescher

[57] ABSTRACT

In a process in which a heating fluid supplied from a furnace is utilized to supply heat to a plurality of processes, method and apparatus is provided for substantially optimizing the operation of the heater by minimizing the amount of the heating fluid which is bypassed around the processes to which the heating fluid is supplied.

18 Claims, 4 Drawing Figures 4,598,669

CONTROL OF A SYSTEM FOR SUPPLYING HEAT

This invention relates to process control. In one aspect, this invention relates to method and apparatus for controlling a system for supplying heat to a plurality of processes.

In many manufacturing processes, a furnace is utilized to heat a fluid stream and the thus heated fluid stream is utilized to supply heat to a plurality of processes. An example of such a system is a natural gas liquefaction process in which hot oil or some other fluid is heated and utilized to supply heat to the reboiler associated with the debutanizer, depropanizer and deethanizer.

Substantial energy savings can be achieved in such a heating system by minimizing the heat input to the furnace which results in reduced feed cost. Also, minimizing the heat input provides other operating advantages.

While minimization of the heat input to the furnace results in significant economic savings, such economic savings cannot be achieved at the expense of not having sufficient heat available during process upsets or that the expense of significantly disturbing the various processes to which heat is supplied from the common source. It is thus an object of this invention to substantially optimize the performance of a heating system by substantially minimizing the heat input to the furnace while still maintaining a sufficient heat flow to each process served by the heating fluid even during periods of process upsets and not causing disturbances in the various processes served by the heating system.

In accordance with the present invention, method and apparatus is provided whereby the heat input to the furnace is substantially minimized by minimizing the amount of the heating fluid which is bypassed around the processes to which the heating fluid is supplied. However, this minimization is accomplished without completely stopping the bypassing of the heating fluid such that the control system is still responsive to process upsets. Also, the minimization is accomplished in such a manner that the heat input minimization responds slowly to a bypassing of the heating fluid which is above a desired value and responds quickly to a bypassing of heating fluid which is below the desired value. The control system responds quickly when too little heat is being supplied and also responds in an optimum manner when too much heat is being supplied. In this manner, the heat input minimization is accomplished without upsetting the processes to which the heating fluid is supplied.

Other objects and advantages of the invention will be apparent from the foregoing brief description of the invention and the claims as well as the detailed description of the drawings which are briefly described as follows:

The invention is illustrated and described in terms of a specific heating system in which hot oil is utilized as the heating fluid and the process served is a natural gas liquefaction process. The specific parts of the natural gas liquefaction process illustrated are the reboilers associated with the debutanizer, depropanizer and deethanizer. However, the invention is applicable to different heating fluids such as steam and is also applicable to serving many different processes.

Figure 1:
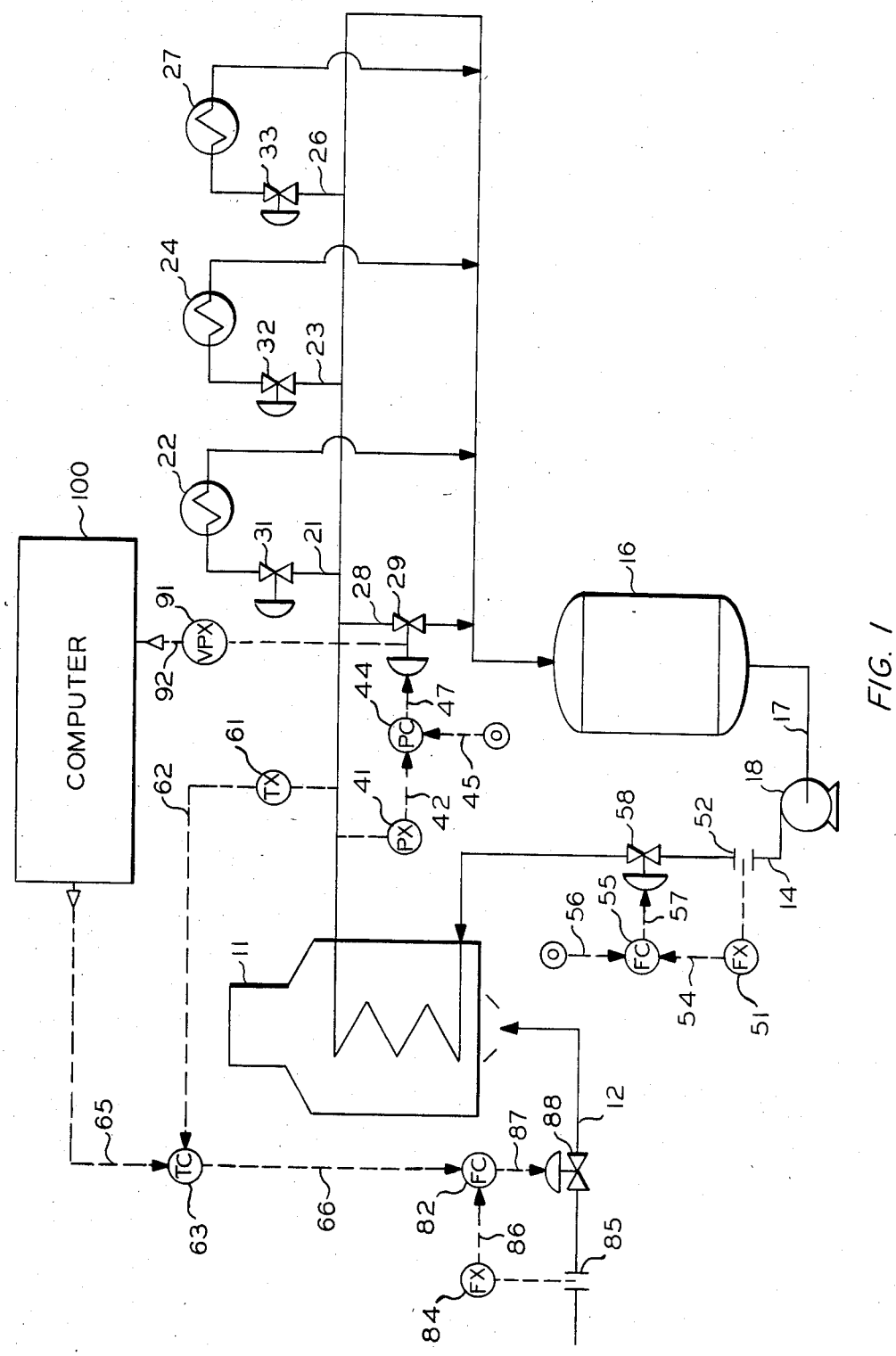
FIG. 1 is a diagrammatic illustration of a heating system serving three reboilers and a first configuration of the associated control system of the present invention.
Figure 4:
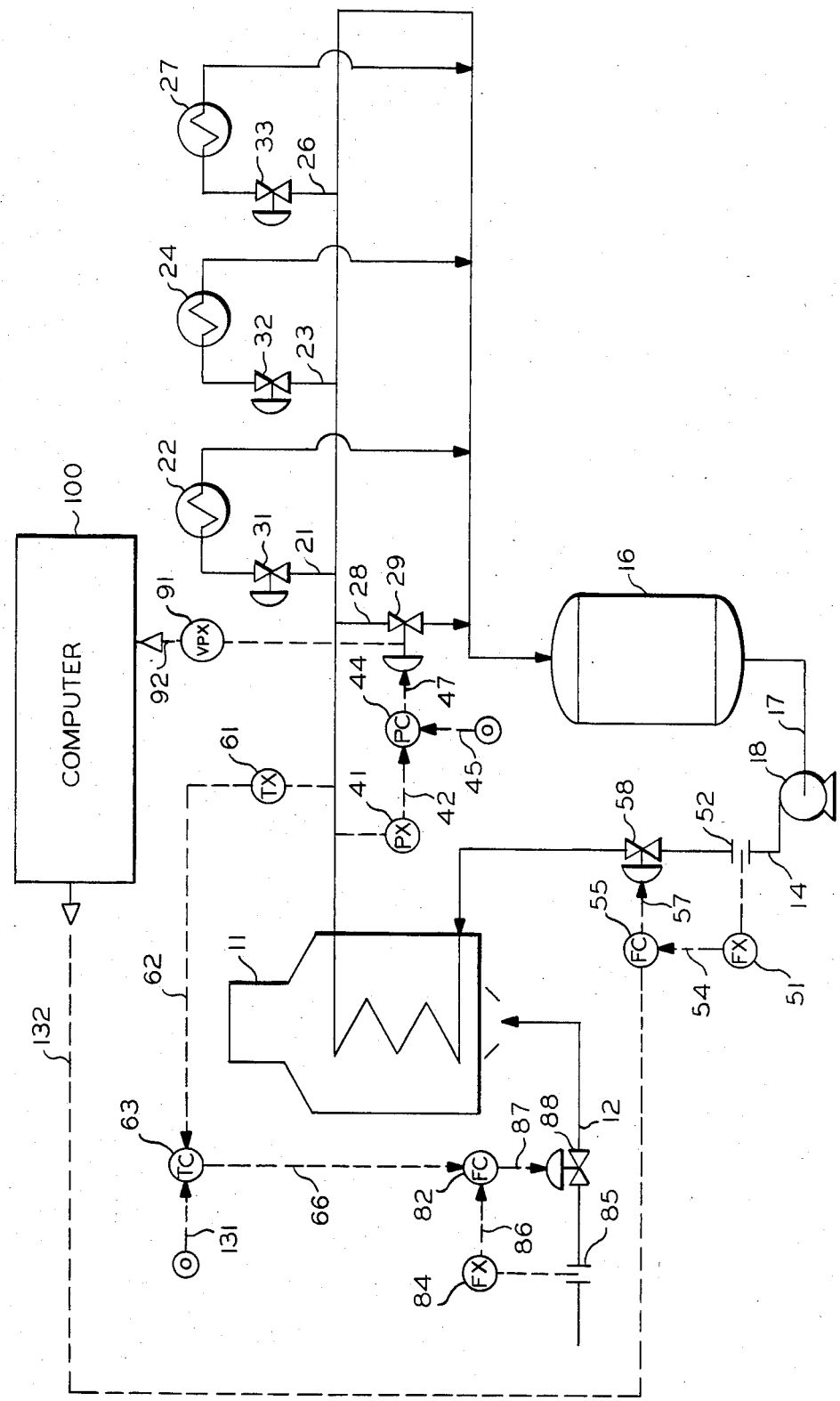
FIG. 4 is a diagrammatic illustration of the heating system of FIG. 1 and a second configuration of the associated control system of the present invention.

A specific control system configuration is set forth in FIGS. 1 and 4 for the sake of illustration. However, the invention extends to different types of control system configurations which accomplish the purpose of the invention. Lines designated as signal lines in the drawings are electrical or pneumatic in this preferred embodiment.

Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form of from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well kown in control system art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the preferred embodiment of the invention utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accomodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationshp to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationshp between the signal units and the measured or desired process units.

Referring now to the drawings and in particular to FIG. 1, there is illustrated a furnace 11 to which fuel is supplied through conduit 12. The combustion of the fuel supplies heat to the furnace 11. Hot oil is circulated to the furnace 11 through conduit 14 which is generally referred to as the hot oil header. Hot oil flowing through the hot oil header 14 eventually is provided to the surge tank 16. Hot oil is removed from the surge tank 16 through conduit 17 and is pumped by pump 18 to the hot oil header 14. This cycle is continued so long as heat is required by the processes being served.

Hot oil is removed from the hot oil header 14 through conduit 21 and is used to supply heat to the reboiler 22 associated with a debutanizer in a natural gas liquefaction process. After passing through the reboiler 22, the hot oil is returned to the hot oil header 14. In like manner, hot oil is withdrawn from the hot oil header 14 through conduit 23 and is utilized to supply heat to the reboiler 24 associated with a depropanizer and hot oil is withdrawn from the hot oil header 14 through conduit 26 and is utilized to supply heat to the reboiler 27 associated with a deethanizer.

The hot oil flowing through the hot oil header 14 may also be bypassed from the furnace 11 to the surge tank 16 through conduit 28. The bypass control valve 29 is operably located in conduit 28.

The flow rate of the heating fluid through conduit 21 to the debutanizer reboiler 22 is maniupulated by changing the position of control valve 31, which is operably located in conduit 21, by means of a debutanizer control system. Many conventional control systems are known. Typically, a flow controller will be provided with a set point signal representative of the flow rate of the hot oil through conduit 21 required to maintain a desired product composition or other desired process variable. The set point signal will be compared to the actual flow rate of the hot oil flowing into conduit 21 and the flow controller would provide an output signal which would be representative of the position of control valve 31 required to maintain the actual flow rate of the hot oil substantially equal to the flow rate represented by the set point.

Control valves 32 and 33, which are located in conduits 23 and 26 respectively, are manipulated in the same manner as described for control valve 31. However, since the control of the processes represented by reboilers 22, 24 and 27 plays no part in the description of the present invention, such control will not be more fully described hereinafter.

It is also noted that a particular advantage of the present invention is the fact that no process measurements are required from the processes to which the heating fluid flowing through the hot oil header 14 is provided. Only the position of the by pass valve 29 is required. Thus, it is not necessary to modify the processes to implement the present control system and also less maintenance is needed which is a significant advantage of the present invention.

Pressure transducer 41 in combination with a pressure sensing device which is operably located in the hot oil header 14, provides an output signal 42 which is representative of the actual pressure in the hot oil header 14. Signal 42 is provided from the pressure transducer 41 as the process variable input to the pressure controller 44.

The pressure controller 44 is also supplied with a set point signal 45 which is representative of the desired pressure in the hot oil header 14. This desired pressure will be determined by material or operating constraints.

In response to signals 42 and 45, the pressure controller 44 provides an output signal 47 which is responsive to the difference between signals 42 and 45. Signal 47 is scaled so as to be representative of the position of the by pass valve 29 required to maintain the actual pressure in the hot oil header 14 substantially equal to the desired pressure represented by signal 45. Signal 47 is provided as a control signal from the pressure controller 44 and control valve 29 is manipulated in response thereto.

Flow transducer 51 in combination with a flow sensor 52, which is operably located in the hot oil header 14, provides an output signal 54 which is representative of the actual flow rate of the hot oil through the hot oil header 14. Signal 54 is provided from the flow trnsducer 51 as the process variable input to the flow controller 55.

The flow controller 55 is also provided with a set point signal 56 which is representative of the desired flow rate of hot oil through the hot oil header 14. The magnitude of signal 56 will be determined by process constraints or by the energy efficiency of the pump 18 at various pumping rates.

In response to signals 54 and 56, the flow controller 55 provides an output signal 57 which is responsive to the difference between signals 54 and 56. Signal 57 is scaled so as to be representative of the position of the control valve 58, which is operably located in the hot oil header 14, required to maintain the actual flow rate of the hot oil through the hot oil header 14 substantially equal to the desired flow rate represented by signal 56. Signal 57 is provided as a control signal from the flow controller 55 and control valve 58 is manipulated in response thereto.

Temperature transducer 61 in combination with a temperature measuring device such as a thermocouple, which is operably located in the hot oil header 14, provides an output signal 62 which is representative of the actual temperature of the hot oil exiting the furnace 11. Signal 62 is provided from the temperature transducer 61 as the process variable input to the temperature controller 63. The temperature controller 63 is provided a set point signal 65 from computer 100. Set point signal 65 will be described more fully hereinafter. However, for purposes of the present description, set point signal 65 is representative of the desired temperature of the hot oil exiting the furnace 11.

In response to signals 62 and 65, the temperature controller 63 provides an output signal 66 which is responsive to the difference between signals 62 and 65. Signal 66 is scaled so as to representative of the flow rate of the fuel flowing through conduit 12 required to maintain the actual exit temperature substantially equal to the desired exit temperature represented by signal 65. Signal 66 is provided from the temperature controller 63 as the set point input to the flow controller 82.

Flow transducer 84 in combination with the flow sensor 85, which is operably located in conduit 12, provides an output signal 86 which is representative of the actual flow rate of the fuel flowing through conduit 12. Signal 86 is provided as the process variable input to the flow controller 82. In response to signals 66 and 86, the flow controller 82 provides an output signal 87 which is responsive to the difference between signals 66 and 86. Signal 87 is scaled so as to be representative of the position of the control valve 88, which is operably located in conduit 12, required to maintain the actual flow rate substantially equal to the desired flow rate represented by signal 66. Signal 87 is provided from the flow controller 82 as the control signal for the control valve 88 and control valve 88 is manipulated in response thereto.

For the sake of discussion, assume that the set point signal 65 is a constant set point representative of some average desired temperature. If this were the case, the temperature represented by signal 65 and the flow rate represented by signal 56 would be selected so as to supply sufficient heat to the processes represented by reboilers 22, 24 and 27 under all circumstances. Heating fluid not required at any particular time would be bypassed through the bypass conduit 28. This bypassing would be accomplished by the pressure control which would open the bypass valve 29 to the extent necessary to bypass any heating fluid not required by the processes. However, such control could result in the bypass valve 29 being driven to a substantially open position which is a waste of heating fluid. Also, such control could result in the bypass valve 29 being driven substantially closed if a large amount of heat is required by the processes. In a substantially closed position, the bypass valve 29 would become unresponsive and a substantial amount of time would be required to open the control valve 29 to any substantial extent.

These difficulties are overcome in accordance with the present invention by changing the magnitude of signal 65 so as to maintain control valve 29 at a desired open position which would typically be in the range of about ten percent open to about fifteen percent open. This is accomplished by using the actual position of the bypass valve 29 as will be described more fully hereinafter. In this manner, the flow of fuel to the furnace 11 is manipulated so as to maintain the bypass valve 29 in a desired position which results in a substantial minimization of the heat input to the furnace 11 while still enabling the control system to respond to process upsets. Also, the response of the control system to a requirement for change is nonlinear which is particularly advantageous as has been briefly described above and will be more fully described hereinafter.

The valve position transducer 91 is operably connected to control valve 29 in such a manner that an output signal 92 is established which is representative of the actual position of control valve 29. Signal 92 is provided from the valve position transducer 91 as an input to computer 100.

Figure 2:
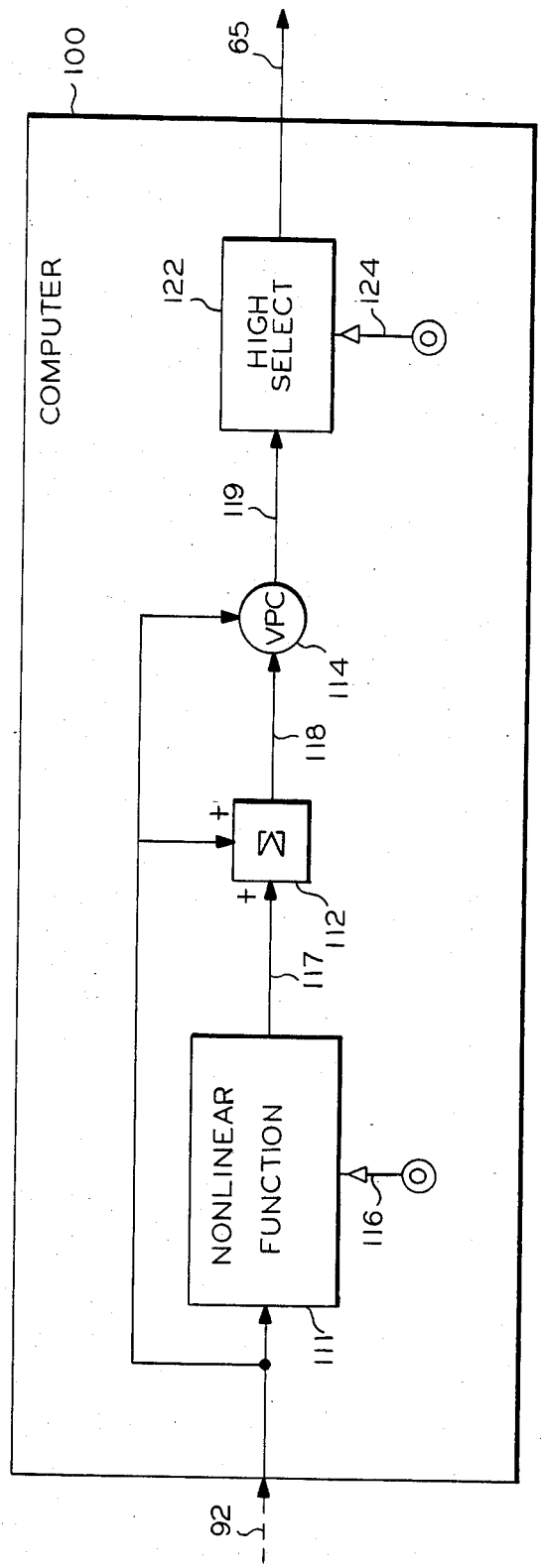
FIG. 2 is a diagram of the computer logic utilized to derive the control signal illustrated in FIG. 1 based on the process measurement illustrated in FIG. 1.

The logic flow diagram utilized to calculate the set point signal 65 in response to the position of control valve 29 represented by signal 92 is illustrated in FIG. 2. Referring now to FIG. 2, signal 92 is provided as an input to the nonlinear function block 111, as an input to the summing block 112 and as the process variable input to the valve position controller 114. The nonlinear function block 111 is also provided with a set point signal 116 which is representative of the desired position of the bypass control valve 29. As previously stated, the desired position represented by signal 116 would typically be in the range of about ten percent open to about fifteen percent open.

In response to signals 92 and 116, the nonlinear function block 111 provides an output signal 117 which has a modifying function. The generation of the modifying signal 117 will be described more fully hereinafter. Signal 117 is provided from the nonlinear function block 111 as a second input to the summing block 112. The modifying signal 117 is added to the process variable signal 92 to establish a set point signal 118. Signal 118 is supplied from the summing block 112 as the set point input to the valve position controller 114.

In response to signals 92 and 118, the valve position controller 114 establishes an output signal 119 which is responsive to the difference between signals 92 and 118. Signal 119 is scaled so as to be representative of the exit temperature from the furnace 11 required to maintain the actual position of the bypass control valve 29 substantially equal to the desired position represented by signal 116. Essentially, a variable set point signal 118 is being utilized to provide the desired control action.

As previously stated in the general discussion of controllers, a controller acts on an error signal (difference between process variable and set point). Signal 117 is utilized to create an error condition if a change in the desired exit temperature is required.

Essentially, if no change in the exit temperature from the furnace 11 is required, signal 117 will be substantially equal to zero and signal 118 will be equal to signal 92. Thus, the error will be zero and the output signal 119 from the valve position controller 114 will not change from its previous value. However, if a change in the exit temperature from the furnace 11 is required, signal 117 will assume some positive or negative magnitude. Signal 118 will thus not be equal to signal 92 and an error condition will be created. This error condition will cause a change in the magnitude of signal 119.

As will be discussed more fully hereinafter, the change in signal 117 is not the same for too high an exit temperature as it is for too low an exit temperature. This variation makes the controller action nonlinear which is desirable.

Signal 119 is provided from the valve position controller 114 as a first input to the high select block 122. The high select block 122 is also provided with a signal 124 which is representative of a minimum exit temperature. The magnitude of signal 124 will be determined by process constraints.

The high select block 122 establishes signal 65 which is equal to the higher of the temperatures represented by signals 119 and 124. Signal 65 is provided as an output from computer 100 and is utilized as previously described.

Figure 3:
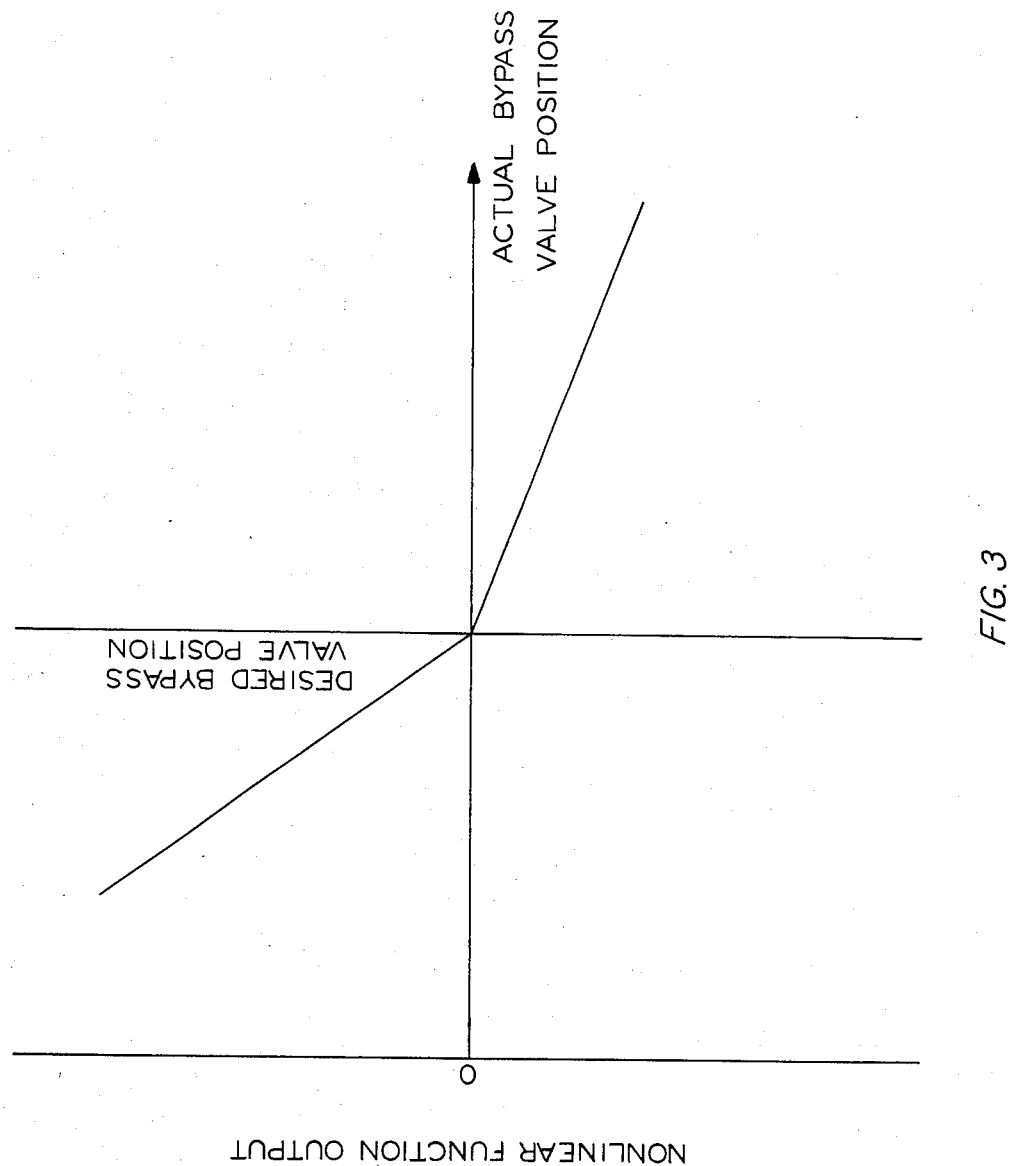
FIG. 3 is an illustration of the functioning of the nonlinear function illustrated in FIG. 2.

The operation of the nonlinear function is illustrated in FIG. 3. As previously stated, if the actual bypass valve position is equal to the desired bypass valve position, the output of the nonlinear function will be zero. If the actual bypass valve position is greater than the desired bypass valve position, than the output of the nonlinear function will have a negative value. If the actual bypass valve position is less than the desired bypass position the nonlinear function output will have a positive value.

As is illustrated in FIG. 3, the nonlinear function output increases more rapidly when the actual bypass valve position is less than the desired bypass valve position than it increases when the actual bypass valve position is greater than the desired bypass valve position. As previously stated, this is important since, if the bypass valve position is below the set point, there is a possibility that sufficient heating fluid will not be available for the processes being serviced. Thus, it is important that the bypass valve position be increased quickly by supplying more fuel to furnace 11 so as to insure that sufficient heating fluid will be available which will avoid process upsets.

In contrast, an actual bypass valve position greater than the desired bypass valve position indicates that too much heat is being supplied. It has been found that cutting back on the heat supplied to the furnace 11 slowly, optimizes the operation of the hot oil system.

An alternative to the preferred control of FIG. 1 is illustrated in FIG. 4. Like numbers refer to like parts of FIG. 1. The change is that a constant set point signal 131 is provided to the temperature controller 63 and a variable set point signal 132 is provided to the flow controller 55. Signal 132 is representative of the desired flow rate of hot oil through the hot oil header 14. The control is accomplished as previously described except that a constant exit temperature will be maintained and the flow rate of the hot oil will be varied. The result is the same in that the heat input to the furnace 11 will be minimized to the extent possible.

The change in FIG. 2 for the alternative control is in the scaling. Essentially, signal 119 will be scaled so as to be representative of the flow rate of hot oil required to maintain the actual bypass valve position substantially equal to the desired bypass valve position. Signal 124 will be representative of a minimum flow rate of hot oil. Signal 65 will become signal 132 and will be representative of the desired flow rate of hot oil through the hot oil header 14.

Again, the nonlinear function illustrated in FIG. 3 will be utilized. However, it may be necessary to change the slope of the nonlinear function output to accommodate for the change to control of the hot oil flow. However, the nonlinear nature of the output will be retained.

The invention has been described in terms of a preferred embodiment as illustrated in FIGS. 1–4. Specific components which can be used in the practice of the invention as illustrated in FIGS. 1–4 such as flow transducers 51 and 84; flow sensors 52 and 85; flow controllers 55 and 82; pressure transducer 41; pressure controller 44; temperature transducer 61; temperature controller 63; valve position transducer 91; and control valves 29, 58, 88, 31, 32 and 33 are each well known, commercially available control components such as are described at length in various Chemical Engineers Handbook, 4th Edition, chapter 22, McGraw Hill. It is also noted that some of the controllers illustrated outside of computer 100 could be implemented on a digital computer if desired.

The additional towers and equipment which would have been associated with a debutanizer, depropanizer and deethanizer as well as additional pumps, heat exchangers, additional control components, etc. which might be associated with a hot oil system have not been illustrated since these additional components play no part in the description of the present invention.

While the invention has been described in terms of the presently preferred embodiment, reasonable variations and modifications are possible by those skilled in the art and such modifications and variations are within the scope of the described invention and the appended claims.

That which is claimed is:

1. Apparatus comprising:
   a furnace having a fluid inlet and a fluid outlet;
   a hot fluid header for passing a fluid stream from the fluid inlet of said furnace through said furnace and from the fluid outlet of said furnace as a heating fluid to at least first and second processes;
   means for supplying a fuel to said furnace, wherein the combustion of said fuel in a combustion zone in said furnace supplies heat to said fluid stream;
   means for bypassing a portion of said fluid stream from the fluid outlet of said furnace around said first and second processes to the fluid inlet of said furnace;
   a first control valve operably located so as to control the bypassing of said fluid stream through said means for bypassing;
   means for establishing a first signal representative of the actual position of said first control valve;
   means for establishing a second signal representative of the desired position of said first control valve;
   means for establishing a third signal representative of the temperature of the fluid stream exiting said furnace required to maintain the actual position of said first control valve substantially equal to the desired position represented by said second signal in response to said first and second signals;
   means for establishing a fourth signal representative of the actual temperature of said fluid stream exiting said furnace;

means for comparing said third signal and said fourth signal and for establishing a fifth signal which is responsive to the difference between said third signal and said fourth signal, wherein said fifth signal is scaled so as to representative of the flow rate of said fuel to said furnace required to maintain the actual exit temperature of said fluid stream substantially equal to the desired exit temperature represented by said third signal; and means for manipulating the flow of said fuel to said furnace in response to said fifth signal.

2. Apparatus in accordance with claim 1 additionally comprising:

a second control valve operably located so as to control the flow of said heating fluid to said furnace;

means for establishing a sixth signal representative of the actual flow rate of said fluid stream to said furnace;

means for establishing a seventh signal representative of the desired flow rate of said fluid stream to said furnace;

means for comparing said sixth signal and said seventh signal and for establishing an eighth signal which is responsive to the difference between said sixth signal and said seventh signal, wherein said eighth signal is scaled so as to be representative of the position of said second control valve required to maintain the actual flow rate of said heating fluid to said furnace substantially equal to the desired flow rate represented by said seventh signal; and means for manipulating said second control valve in response to said eighth signal.

3. Apparatus in accordance with claim 2 additionally comprising:

means for establishing a ninth signal representative of the actual pressure of the fluid stream exiting said furnace;

means for establishing a tenth signal representative of the desired pressure of said fluid stream exiting said furnace;

means for comparing said ninth signal and said tenth signal and for establishing an eleventh signal which is responsive to the difference between said ninth signal and said tenth signal, wherein said eleventh signal is scaled so as to be representative of the position of said first control valve required to maintain the actual pressure represented by said ninth signal substantially equal to the desired pressure represented by said tenth signal; and means for manipulating said first control valve in response to said eleventh signal.

4. Apparatus in accordance with claim 3 wherein said means for manipulating the flow of said fuel to said furnace in response to said fifth signal comprises:

a third control valve operably located so as to control the flow rate of said fuel;

means for establishing a twelfth signal representative of the actual flow rate of said fuel;

means for comparing said fifth signal and said twelfth signal and for establishing a thirteenth signal which is responsive to the difference between said fifth signal and said twelfth signal, wherein said thirteen signal is scaled so as to be representative of the position of said third control valve required to maintain the actual flow rate of said fuel substantially equal to the desired flow rate represented by said fifth signal; and means for manipulating said third control valve in response to said thirteenth signal.

5. Apparatus in accordance with claim 1 wherein said means for establishing said third signal in response to said first signal and said second signal comprises:

a valve position controller;

means for establishing a variable set point signal in response to said first signal and said second signal and for supplying said variable set point signal as a set point input to said valve position controller, wherein the magnitude of said variable set point signal automatically varies as a nonlinear function of the actual position of said first control valve with respect to the desired position represented by said second signal and wherein said nonlinearity varies with respect to whether the actual position of said first control valve is greater than or less than the desired position represented by said second signal;

means for supplying said first signal as the process variable input to said valve position controller, wherein said valve position controller establishes a sixth signal which is responsive to the difference between said variable set point signal and said first signal and wherein said sixth signal is representative of the exit temperature of said fluid stream required to maintain the actual position of said first control valve substantially equal to the desired position represented by said second signal;

means for establishing a seventh signal representative of the minimum desired exit temperature for said fluid stream;

a high select, wherein said sixth signal and said seventh signal are provided as inputs to said high select and wherein said high select establishes said fifth signal which is equal to the highest of the temperatures represented by said sixth signal and said seventh signal.

6. A method for controlling a system for supplying heat to a plurality of processes, wherein fuel is supplied to a furnace with the combustion of said fuel in a combustion zone in said furnace supplying heat to a fluid stream passing through said furnace, wherein said fluid stream is withdrawn from said furnace and is supplied as a heating fluid to said plurality of processes, and wherein a portion of said fluid stream flowing from said furnace is bypassed around said plurality of processes through a first control valve to said furnace, said method comprising the steps of:

establishing a first signal representative of the actual position of said first control valve;

establishing a second signal representative of the desired position of said first control valve;

establishing a third signal representative of the temperature of the fluid stream exiting said furnace required to maintain the actual position of said first control valve substantially equal to the desired position represented by said second signal in response to said first and second signals;

establishing a fourth signal representative of the actual temperature of said fluid stream exiting said heater;

comparing said third signal and said fourth signal and establishing a fifth signal which is responsive to the difference between said third signal and said fourth signal, wherein said fifth signal is scaled so as to representative of the flow rate of said fuel to said furnace required to maintain the actual exit temperature of said fluid stream substantially equal to the desired exit temperature represented by said third signal; and manipulating the flow of said fuel to said furnace in response to said fifth signal.

7. A method in accordance with claim 6 additionally comprising the steps of:

establishing a sixth signal representative of the actual flow rate of said fluid stream to said furnace;

establishing a seventh signal representative of the desired flow rate of said fluid stream to said furnace;

comparing said sixth signal and said seventh signal and establishing an eighth signal which is responsive to the difference between said sixth signal and said seventh signal, wherein said eighth signal is scaled so as to be representative of the position of a second control valve, operably located so as to control the flow of said heating fluid to said furnace, required to maintain the actual flow rate of said heating fluid to said furnace substantially equal to the desired flow rate represented by said seventh signal; and manipulating said second control valve in response to said eighth signal.

8. A method in accordance with claim 7 additionally comprising the steps of:

establishing a ninth signal representative of the actual pressure of the fluid stream exiting said furnace;

establishing a tenth signal representative of the desired pressure of said fluid stream exiting said furnace;

comparing said ninth signal and said tenth signal and establishing an eleventh signal which is responsive to the difference between said ninth signal and said tenth signal, wherein said eleventh signal is scaled so as to be representative of the position of said first control valve required to maintain the actual pressure represented by said ninth signal substantially equal to the desired pressure represented by said tenth signal; and manipulating said first control valve in response to said eleventh signal.

9. A method in accordance with claim 8 wherein said step of manipulating the flow of said fuel to said furnace in response to said fifth signal comprises:

establishing a twelfth signal representative of the actual flow rate of said fuel;

comparing said fifth signal and said twelfth signal and establishing a thirteenth signal which is responsive to the difference between said fifth signal and said twelfth signal, wherein said thirteenth signal is scaled so as to be representative of the position of a third control valve, operably located so as to control the flow rate of said fuel, required to maintain the actual flow rate of said fuel substantially equal to the desired flow rate represented by said fifth signal; and manipulating said third control valve in response to said thirteenth signal.

10. A method in accordance with claim 6 wherein said step of establishing said third signal in response to said first signal and said second signal comprises:

establishing a variable set point signal in response to said first signal and said second signal and supplying said variable set point signal as a set point input to a valve position controller, wherein the magnitude of said variable set point signal automatically varies as a nonlinear function of the actual position of said first control valve with respect to the desired position represented by said second signal and wherein said nonlinearity varies with respect to whether the actual position of said first control valve is greater than or less than the desired position represented by said second signal;

supplying said first signal as the process variable input to said valve position controller, wherein said valve position controller establishes a sixth signal which is responsive to the difference between said variable set point signal and said first signal and wherein said sixth signal is representative of the exit temperature of said fluid stream required to maintain the actual position of said first control valve substantially equal to the desired position represented by said second signal;

establishing a seventh signal representative of the minimum desired exit temperature for said fluid stream;

establishing said fifth signal in response to said sixth and seventh signals, wherein said fifth signal is equal to the highest of the temperatures represented by said sixth signal and said seventh signal.

11. Apparatus comprising:

a furnace having a fluid inlet and a fluid outlet;

a hot fluid header for passing a fluid stream from the fluid inlet of said furnace through said furnace and from the fluid outlet of said furnace as a heating fluid to at least first and second processes;

means for supplying a fuel to said furnace, wherein the combustion of said fuel in a combustion zone in said furnace supplies heat to said fluid stream;

means for bypassing a portion of said fluid stream from the fluid outlet of said furnace around said first and second processes to the fluid inlet of said furnace;

a first control valve operably located so as to control the bypassing of said fluid stream through said means for bypassing;

means for establishing a first signal representative of the actual position of said first control valve;

means for establishing a second signal representative of the desired position of said first control valve;

means for establishing a third signal representative of the flow rate of said fluid stream through said hot fluid header required to maintain the actual position of said first control valve substantially equal to the desired position represented by said second signal in response to said first and second signals;

means for establishing a fourth signal representative of the actual flow rate of said fluid stream through said hot fluid header;

a second control valve operably located so as to control the flow of said fluid stream through said hot fluid header;

means for comparing said third signal and said fourth signal and for establishing a fifth signal which is responsive to the difference between said third signal and said fourth signal, wherein said fifth signal is scaled so as to representative of the position of said second control valve required to maintain the actual flow rate of said fluid stream substantially equal to the desired flow rate represented by said third signal; and means for manipulating said second control valve in response to said fifth signal.

12. Apparatus in accordance with claim 11 additionally comprising:
- a third control valve operably located so as to control the flow rate of said fuel;
- means for establishing a sixth signal representative of the actual temperature of the fluid stream exiting said furnace;
- means for establishing a seventh signal representative of the desired temperature of the fluid stream exiting said furnace;
- means for comparing said sixth signal and said seventh signal and for establishing an eighth signal which is responsive to the difference between said sixth signal and said seventh signal, wherein said eighth signal is scaled so as to be representative of the flow rate of said fuel to said furnace required to maintain the actual exit temperature of said fluid stream substantially equal to the desired exit temperature represented by said sixth signal;
- means for establishing a ninth signal representative of the actual flow rate of said fuel;
- means for comparing said eighth signal and said ninth signal and for establishing a tenth signal which is responsive to the difference between said eighth signal and said ninth signal, wherein said tenth signal is scaled so as to be representative of the position of said third control valve required to maintain the actual flow rate of said fuel substantially equal to the desired flow rate represented by said eighth signal; and
- means for manipulating said third control valve in response to said tenth signal.

13. Apparatus in accordance with claim 12 additionally comprising:
- means for establishing an eleventh signal representative of the actual pressure of the fluid stream exiting said furnace;
- means for establishing a twelfth signal representative of the desired pressure of said fluid stream exiting said furnace;
- means for comparing said eleventh signal and said twelfth signal and for establishing a thirteenth signal which is responsive to the difference between said eleventh signal and said twelfth signal, wherein said thirteenth signal is scaled so as to be representative of the position of said first control valve required to maintain the actual pressure represented by said eleventh signal substantially equal to the desired pressure represented by said twelfth signal; and
- means for manipulating said first control valve in response to said thirteenth signal.

14. Apparatus in accordance with claim 11 wherein said means for establishing said third signal in response to said first signal and said second signal comprises:
- a valve position controller:
- means for establishing a variable set point signal in response to said first signal and said second signal and for supplying said variable set point signal as a set point input to said valve position controller, wherein the magnitude of said variable set point signal automatically varies as a nonlinear function of the actual position of said first control valve with respect to the desired position represented by said second signal and wherein said nonlinearity varies with respect to whether the actual position of said first control valve is greater than or less than the desired position represented by said second signal;
- means for supplying said first signal as the process variable input to said valve position controller, wherein said valve position controller establishes a sixth signal which is responsive to the difference between said variable set point signal and said first signal and wherein said sixth signal is representative of the flow rate of said fluid stream required to maintain the actual position of said first control valve substantially equal to the desired position represented by said second signal;
- means for establishing a seventh signal representative of the minimum desired flow rate for said fluid stream;
- a high select, wherein said sixth signal and said seventh signal are provided as inputs to said high select and wherein said high select establishes said fifth signal which is equal to the highest of the flow rates represented by said sixth signal and said seventh signal.

15. A method for controlling a system for supplying heat to a plurality of processes wherein fuel is supplied to a furnace with the combustion of said fuel in a combustion zone in said furnace supplying heat to a fluid stream passing through said furnace, wherein said fluid stream is withdrawn from said furnace and is supplied through a hot fluid header as a heating fluid to said plurality of processes, wherein a portion of said fluid stream flowing from said furnace is bypassed around said plurality of processes through a first control valve to said furnace and wherein the flow of said fluid stream through said hot fluid header is controlled by a second control valve, said method comprising the steps of:
- establishing a first signal representative of the actual position of said first control valve;
- establishing a second signal representative of the desired position of said first control valve;
- establishing a third signal representative of the flow rate of said fluid stream through said hot fluid header required to maintain the actual position of said first control valve substantially equal to the desired position represented by said second signal in response to said first and second signals;
- establishing a fourth signal representative of the actual flow rate of said fluid stream through said hot fluid header;
- comparing said third signal and said fourth signal and establishing a fifth signal which is responsive to the difference between said third signal and said fourth signal, wherein said fifth signal is scaled so as to representative of the position of said second control valve required to maintain the actual flow rate of said fluid stream substantially equal to the desired flow rate represented by said third signal; and
- manipulating said second control valve in response to said fifth signal.

16. A method in accordance with claim 15 additionally comprising the steps of:
- establishing a sixth signal representative of the desired temperature of the fluid stream exiting said furnace;
- establishing a seventh signal representative of the desired temperature of the fluid stream exiting said furnace;
- comparing said sixth signal and said seventh signal and establishing an eighth signal which is responsive to the difference between said sixth signal and said seventh signal, wherein said eighth signal is scaled so as to be representative of the flow rate of said fuel to said furnace required to maintain the actual exit temperature of said fluid stream substantially equal to the desired exit temperature represented by said sixth signal;

establishing a ninth signal representative of the actual flow rate of said fuel;

comparing said eighth signal and said ninth signal and establishing a tenth signal which is responsive to the difference between said eighth signal and said ninth signal, wherein said tenth signal is scaled so as to be representative of the position of a third control valve, operably located so as to control the flow rate of said fuel, required to maintain the actual flow rate of said fuel substantially equal to the desired flow rate represented by said eighth signal; and manipulating said third control valve in response to said tenth signal.

17. A method in accordance with claim 16 additionally comprising the steps of:

establishing an eleventh signal representative of the actual pressure of the fluid stream exiting said furnace;

establishing a twelfth signal representative of the desired pressure of said fluid stream exiting said furnace;

comparing said eleventh signal and said twelfth signal and establishing a thirteenth signal which is responsive to the difference between said eleventh signal and said twelfth signal, wherein said thirteenth signal is scaled so as to be representative of the position of said first control valve required to maintain the actual pressure represented by said eleventh signal substantially equal to the desired pressure represented by said twelfth signal; and manipulating said first control valve in response to said thirteenth signal.

18. A method in accordance with claim 15 wherein said step of establishing said third signal in response to said first signal and said second signal comprises:

establishing a variable set point signal in response to said first signal and said second signal and for supplying said variable set point signal as a set point input to a valve position controller, wherein the magnitude of said variable set point signal automatically varies as a nonlinear function of the actual position of said first control valve with respect to the desired position represented by said second signal and wherein said nonlinearity varies with respect to whether the actual position of said first control valve is greater than or less than the desired position represented by said second signal;

supplying said first signal as the process variable input to said valve position controller, wherein said valve position controller establishes a sixth signal which is responsive to the difference between said variable set point signal and said first signal and wherein said sixth signal is representative of the flow rate of said fluid stream required to maintain the actual position of said first control valve substantially equal to the desired position represented by said second signal;

establishing a seventh signal representative of the minimum desired flow rate for said fluid stream;

establishing said fifth signal in response to said sixth and seventh signals, wherein said fifth signal is equal to the highest of the flow rates represented by said sixth signal and said seventh signal.

* * * * *